(12) United States Patent
Chessell et al.

(10) Patent No.: US 7,472,379 B2
(45) Date of Patent: Dec. 30, 2008

(54) FLEXIBLE NAVIGATION OF A WORKFLOW GRAPH

(75) Inventors: Amanda E. Chessell, Alton (GB);
Vernon M. Green, Newbury (GB);
Catherine S. Griffin, Romsey (GB);
David J. Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1200 days.

(21) Appl. No.: 10/093,426

(22) Filed: Mar. 7, 2002

(65) Prior Publication Data

US 2002/0184616 A1    Dec. 5, 2002

(30) Foreign Application Priority Data

May 30, 2001    (GB)  ................. 0113044.2

(51) Int. Cl.
*G06F 9/44*      (2006.01)
*G06F 12/00*      (2006.01)

(52) U.S. Cl. ................. 717/132; 717/127; 717/144; 717/156; 707/200

(58) Field of Classification Search ............. 717/100, 717/136, 101, 106, 109, 120–135; 707/1, 707/8, 103 R, 200; 715/751, 526; 705/15, 705/39, 7–9; 709/226, 318; 702/27, 189; 714/16; 345/522; 718/102
See application file for complete search history.

(56) References Cited

U.S. PATENT DOCUMENTS

| | | | | |
|---|---|---|---|---|
| 5,706,452 A | * | 1/1998 | Ivanov | 715/751 |
| 5,737,727 A | * | 4/1998 | Lehmann et al. | 705/7 |
| 5,819,022 A | * | 10/1998 | Bandat | 714/16 |
| 5,960,404 A | * | 9/1999 | Chaar et al. | 705/8 |
| 5,960,420 A | * | 9/1999 | Leymann et al. | 707/1 |
| 6,009,405 A | * | 12/1999 | Leymann et al. | 705/9 |
| 6,011,917 A | * | 1/2000 | Leymann et al. | 717/104 |
| 6,052,684 A | * | 4/2000 | Du | 707/8 |
| 6,253,369 B1 | * | 6/2001 | Cloud et al. | 717/136 |
| 6,256,651 B1 | * | 7/2001 | Tuli | 715/526 |
| 6,272,537 B1 | | 8/2001 | Kekic et al. | 709/223 |
| 6,397,191 B1 | * | 5/2002 | Notani et al. | 705/9 |
| 6,405,210 B1 | * | 6/2002 | Doyle et al. | 707/103 R |
| 6,631,354 B1 | * | 10/2003 | Leymann et al. | 705/8 |

(Continued)

FOREIGN PATENT DOCUMENTS

GB     2349052     10/2000

(Continued)

OTHER PUBLICATIONS

Zwang, Digital workflows: We can work it out, American Printer. Chicago: Feb. 2001. vol. 226, Iss. 5; p. 26 (4 pages).*

(Continued)

*Primary Examiner*—Wei Y. Zhen
*Assistant Examiner*—Satish S. Rampuria
(74) *Attorney, Agent, or Firm*—David A. Mims, Jr.

(57) ABSTRACT

A workflow application is represented by a graph comprising a plurality of components, some of which may be processes. At least two of the processes are interpreted according to different respective sets of rules. The sets of rules are implemented in either a plurality of respective navigation engines or in a single engine implementing multiple sets of rules.

15 Claims, 5 Drawing Sheets

U.S. PATENT DOCUMENTS

| | | | |
|---|---|---|---|
| 6,772,407 B1 * | 8/2004 | Leymann et al. | 717/100 |
| 6,799,314 B2 * | 9/2004 | Beniyama et al. | 717/100 |
| 6,813,761 B1 * | 11/2004 | Das et al. | 717/132 |
| 6,816,902 B1 * | 11/2004 | Bandat et al. | 709/226 |
| 6,826,579 B1 * | 11/2004 | Leymann et al. | 717/131 |
| 6,839,062 B2 * | 1/2005 | Aronson et al. | 345/522 |
| 6,889,375 B1 * | 5/2005 | Chan et al. | 717/123 |
| 7,024,670 B1 * | 4/2006 | Leymann et al. | 718/102 |
| 7,174,534 B2 * | 2/2007 | Chong et al. | 717/105 |
| 2002/0091559 A1 * | 7/2002 | Beniyama et al. | 705/9 |
| 2002/0091560 A1 * | 7/2002 | Suzuki et al. | 705/9 |
| 2002/0128890 A1 * | 9/2002 | Dick et al. | 705/8 |
| 2002/0169752 A1 * | 11/2002 | Kusama et al. | 707/1 |
| 2002/0170035 A1 * | 11/2002 | Casati et al. | 717/127 |
| 2002/0184610 A1 * | 12/2002 | Chong et al. | 717/109 |
| 2002/0194393 A1 * | 12/2002 | Hrischuk et al. | 709/318 |
| 2003/0014314 A1 * | 1/2003 | Griep et al. | 705/15 |
| 2003/0093229 A1 * | 5/2003 | Wang Ho | 702/27 |
| 2003/0120593 A1 * | 6/2003 | Bansal et al. | 705/39 |
| 2004/0015833 A1 * | 1/2004 | Dellarocas et al. | 717/106 |
| 2004/0254768 A1 * | 12/2004 | Kim et al. | 702/189 |
| 2005/0066304 A1 * | 3/2005 | Tattrie et al. | 717/101 |

FOREIGN PATENT DOCUMENTS

| | | |
|---|---|---|
| WO | WO 01/63529 A1 | 8/2001 |

OTHER PUBLICATIONS

Zhuge et al., A timed workflow process model, The Journal of Systems and Software. New York: Jan. 15, 2001. vol. 55, Iss. 3; p. 231 (Abstract only).*

Kumar et al., Dynamic Woek Distribution in Workflow Management Systems: How to Balance Quality and Performance, 2001/2002, Porquest.com, ABI/Inform Global, p. 157-193.*

Version management in a distributed workflow application, McClatchey, R.; Baker, N.; Harris, W.; Le Goff, J.-M.; Kovacs, Z.; Estrella, F.; Bazan, A.; Le Flour, T.; IEEE, 1997, pp. 10-15.*

Dynamic workflow management: a framework for modeling workflows, Kwan, M.M.; Balasubramanian, P.R.; IEEE, vol. 4, 1997 pp. 367-376.*

Dynamic workflow schema evolution based on workflow type versioning and workflow migration, Kradolfer, M.; Geppert, A.; IEEE, 1999 pp. 104-114.*

* cited by examiner

FLEXIBLE NAVIGATION OF A WORKFLOW GRAPH

FIELD OF THE INVENTION

The present invention is in the field of definition and execution of workflow graphs and more particularly, of graphs which are defined in a visual programming tool and executed using a navigator.

BACKGROUND OF THE INVENTION

Whilst traditional programming languages, such as C, C++ or Java, are very powerful and provide enormous scope to the programmer they are also complex and require extremely specialised skills. In addition complex applications require large amounts of code and often require a large team of programmers who are too far removed from the initial concepts and designs such that solutions become inefficient or different from that originally intended. As a result in some areas of software development, such as application programming, alternative techniques are evolving.

One such technique involves creating self contained pieces of software, known as components, and then scripting components together to create new components. The new component created is referred to as the parent component and its constituent components are referred to as child components. The scripting code controls execution of the parent process by controlling, for example when each child is run, where its inputs are from, where its outputs go, and what to do in the event of its failure. The basic philosophy is that, for example, business logic is written as small independent components, and applications are defined by combining these components so that they communicate in a loosely coupled manner within a managed environment. This enables application development to much more rapid since re-use for components is possible and components have clear, well defined functions.

In general, there are two key approaches to scripting together components in order to build parent components.

The first approach is to use some kind of scripting language or programming language to control the running of child components. The main advantage of this approach is that the programmer has unlimited scope to "code" when the child components are started and what actions to take with the results. The disadvantage is that this coding is still a specialized skill, each parent component must be coded by hand and the previously mentioned problems associated with existing programming with languages such as C, C++ and Java are not fully addressed.

The second approach is to provide a "builder-type" development tool that allows the application developer to draw the child components and link them together to form a graph of components. Links, for example, join the output(s) of one child component to the input(s) of another, thus specifying child component inputs, outputs and the order in which they are run. At run time an engine, known as a navigation engine, reads the graph description and runs the specified child components as specified by the graph, thus effectively automatically generating the scripting code of the first approach. Examples of this are the IBM products MQSeries Workflow and MQSeries Integrator.

"Production Workflow Concepts and Techniques" by Frank Leymann and Dieter Roller, 2000, ISBN 0-13-021753-0, discusses fully this type of "builder-type" programming and is currently considered the state of the art in this field.

An example of such a graph in a "builder-type" development tool is shown in FIG. 2 in which a parent process (201) with input port (202) and two output ports (203, 204), comprises three child components (206, 207, 208). The child components (206, 207, 208) have input ports (220, 223, 209) and output ports (221, 222, 224, 210). Arrows, such as 205, connect the output ports of one component to the input ports of others, and therefore describes the control flow. Note that processes can be nested and so a child component of a process can also be a process. This is shown for child component 208 which is also a process which comprises one input (209), one output (210), and four child components (211,212,213, 214). The four child components (211,212,213,214) have input ports (225, 228,230 232, 233) and output ports (226, 227, 229, 231,234). For a graph such as this, the navigation engine, on receipt of a control flow/data flow to the input 202, must: start component 206 and pass it the input flow; wait for component 206 to produce an output; end component 206; depending on which point output from component 206 is generated, start either component 207 or 208 and pass it the input flow; and so on until the graph completes.

The advantage of this type of approach is that the problem of writing and maintaining the scripting code is removed and so it is very easy to build new parent components and modify them later. The disadvantage is that the flexibility of writing the scripting code is removed and the programmer is restricted to the features of the graph and the capabilities of the associated navigation engine. As a result all possible paths through the graph need to be specified explicitly and for some problems this can lead to huge and complex graphs.

The present invention is concerned with reducing the aforementioned disadvantages of the "builder-type" environment.

SUMMARY OF THE INVENTION

This invention describes a new approach to the "builder-type" programming environment.

Accordingly, according to a first aspect the invention provides: a data processing method for running a workflow application in a data processing system, the method comprising: running a workflow application, comprising a plurality of components, each component performing a defined function, the components being arranged to form a graph, wherein a component which comprises at least one other component is a process and wherein the graph comprises a plurality of processes; interpreting the graph wherein at least two of said plurality of processes are interpreted according to different respective sets of rules.

According to a second aspect the present invention provides a computer program product, recorded on a medium, comprising instructions which when executed on a data processing system causes said system to carry out the method of: running a workflow application, comprising a plurality of components, each component performing a defined function, the components being arranged to form a graph, wherein a component which comprises at least one other component is a process and wherein the graph comprises a plurality of processes; interpreting the graph wherein at least two of said plurality of processes are interpreted according to different respective sets of rules.

According to a third aspect the present invention provides a data processing system for running a workflow application the application comprising: a plurality of components, each component performing a defined function, the components being arranged to form a graph, wherein a component which comprises at least one other component is a process and wherein the graph comprises a plurality of processes; the system comprising: means to interpret the graph wherein at least two of said plurality of processes are interpreted according to different respective sets of rules;

This allows more than one set of rules to be used in interpreting a workflow graph. Each set of rules specifies how a given process (a component which comprises one or other components) controls its child components, for example, when it starts them, how many instances (copies) it creates and how errors are processed. Therefore, the application developer often only has to specify which child components the parent component needs to operate on and is spared the effort of defining any of the control flows between them.

Preferably each set of rules is implemented in a different navigation engine and then a process is configured with an indication of which navigation engine is to be used to interpret it. This indication can then be used to select the appropriate navigation engine when interpreting the process.

Alternatively one navigation engine implements a plurality of sets of rules and a process is configured with a indication of which set of rules are to be used to interpret it. This is then used by the navigation engine to select an appropriate set of rules when interpreting the process.

A data file may be associated with a process and contain such things as data relating to the components that are contained within the process. Preferably this data file is also used to contain details of the navigation engine to be used to interpret the process. The details could be such things as the name of the file that implements the engine, a name associated with the set of rules the navigation engine is to use, or some other identifier used to identify the correct navigation engine. These details may them be read before interpreting the process and used to ensure that the correct navigation engine is called to interpret the process. This is a useful addition as the data files can be created by application developers who can then specify, for example, a navigation engine that they have written.

If details of the navigation engine are contained in a data file associated with a process, preferably the details of the file are passed to the navigation engine. This enables the file to be used to inform the navigation engine of additional information on how it should handle its child component(s) such as whether or not they require a transaction.

Preferably there is a set of rules available which specify that all components in a process are started successively without waiting for previously started processes to complete.

Preferably there is a set of rules available which specify that each component in a process is started successively, the next component not being started until the previous component has stopped, wherein the order in which components are started is defined in the graph of the process.

Preferably there is a set of rules available which specify that a process must contain only one component, a new instance of the component being started each time the process receives a new message.

Preferably there is a set of rules available which specify that a process must contain a single activity, which can be started and executed in a predefined environment such as a transaction.

Note that interpreting a workflow graph means to follow and execute the graph as defined.

BRIEF DESCRIPTION OF THE DRAWINGS

The invention will now be described, by way of example only, with reference to a preferred embodiment thereof, as illustrated in the accompanying drawings, in which.

DESCRIPTION OF THE PREFERRED EMBODIMENT

Figure 1:
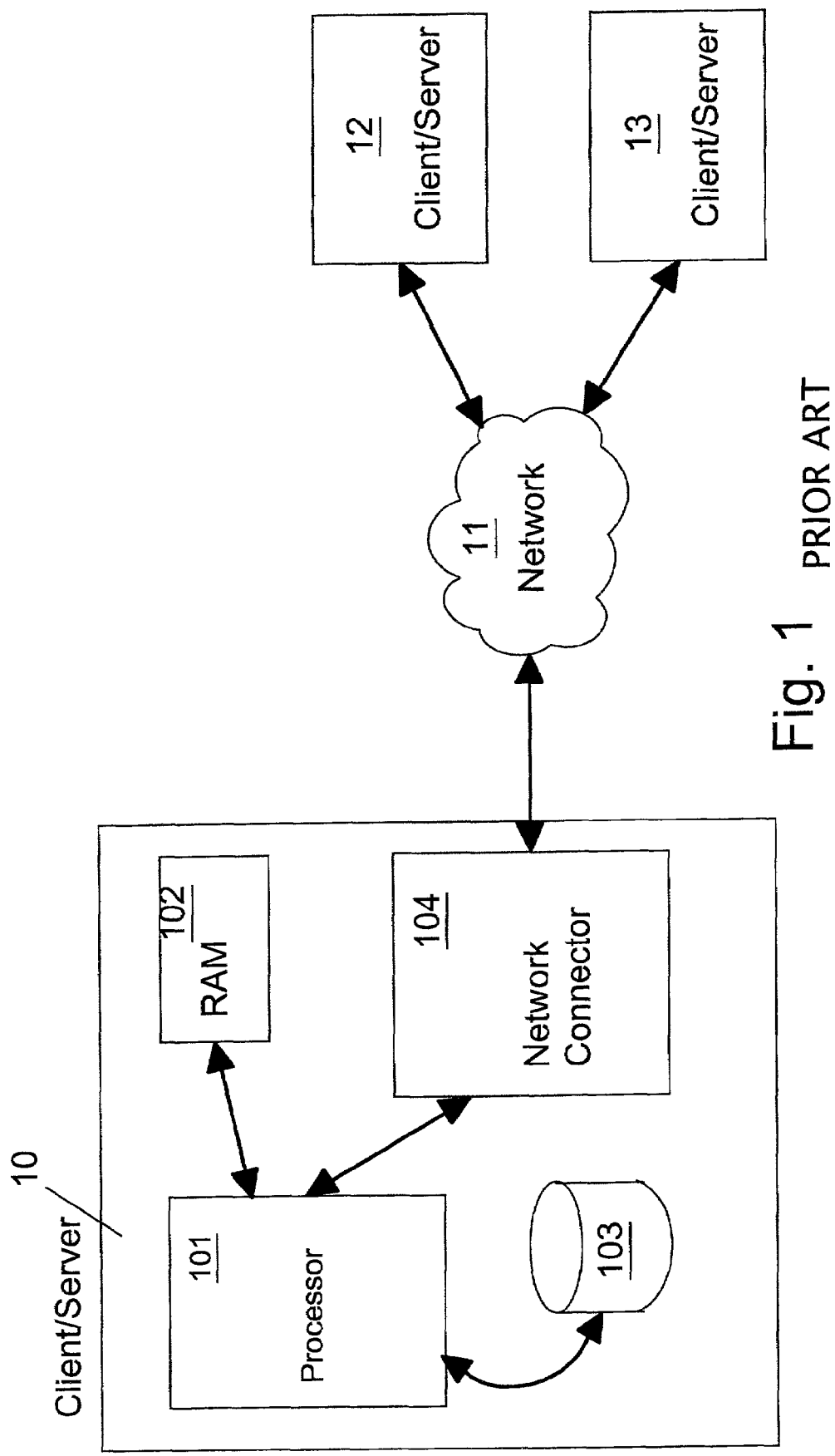
FIG. 1 is a block diagram of a data processing environment in which the preferred embodiment of the present invention can be advantageously applied.
Figure 2:
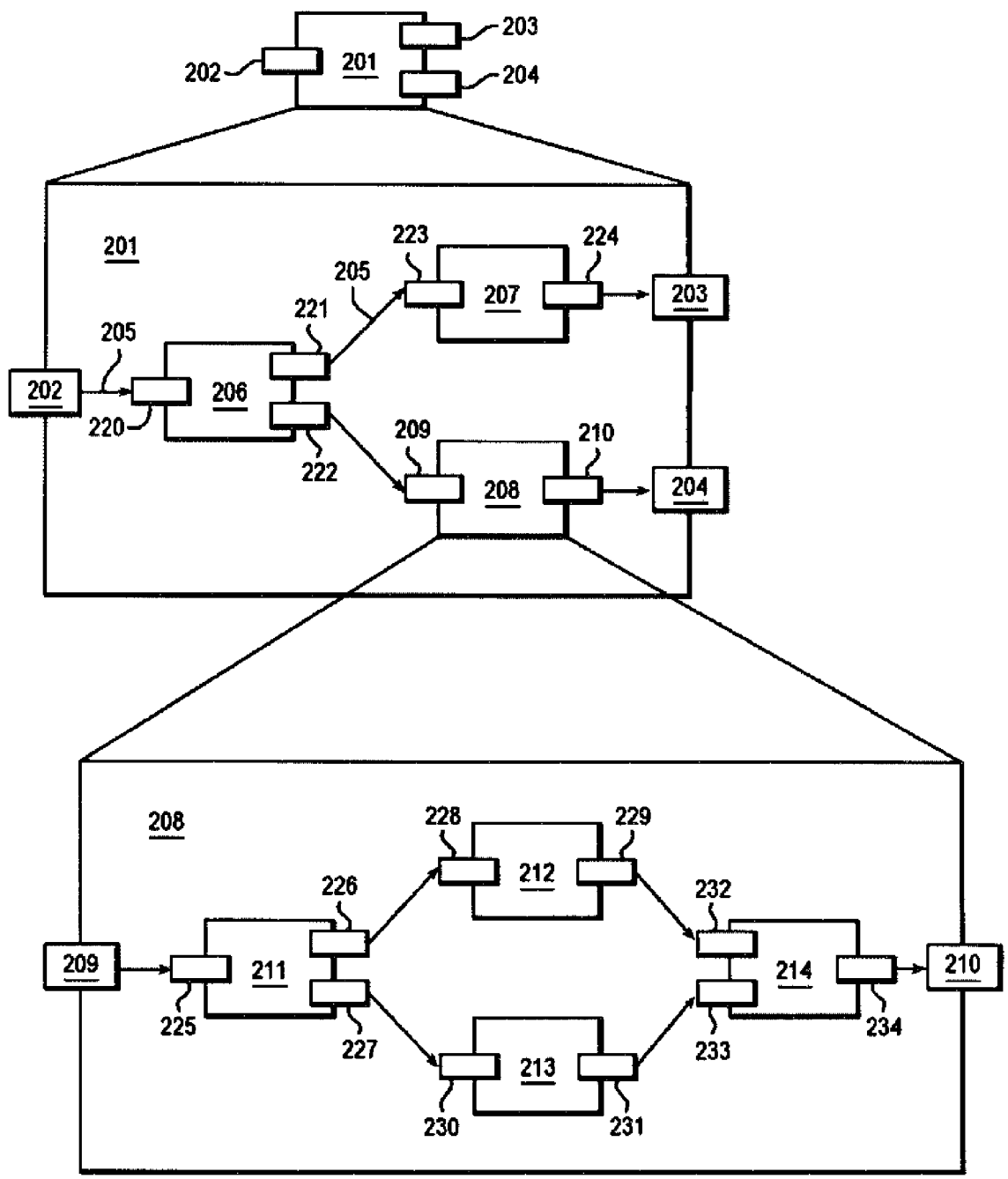
FIG. 2 is a block diagram of a example of a workflow graph according to the prior art.

FIG. 1 is a block diagram of a data processing environment in which the preferred embodiment of the present invention can be advantageously applied; In FIG. 1, a client/server data processing apparatus 10 is connected to other client/server data processing apparatuses 12 and 13 via a network 11, which could be, for example, the Internet. The client/servers 10, 12 and 13 act in isolation or interact with each other, in the preferred embodiment, to carry out work, such as the definition and execution of a workflow graph. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

The preferred embodiment of the present invention is implemented in a "builder-type" development and execution environment for the programming of a business application. This environment is referred to as Business Process Beans (BPBeans).

BPBeans components are split into activities and processes:

An activity is a small JavaBean ("Java" and "JavaBean" are trademarks of Sun Microsystems, Inc.) which represents a very simple task that needs to be performed by the IT system. In general, this involves: processing some data; and maybe updating some stored data and producing a result. The data processed may be received as input or read from a database. Some activities are provided as part of BPBeans and others are written by application developers. Either way, they are combined together, in a graph, to form a process.

A process contains one or more components which could be activities and/or processes. Each process is therefore a parent and the activities and/or processes that it contains are its child components. A process is executed by a navigator which is responsible for controlling when and how many instances of the child components are created, run and removed. Child components can be connected together so that the output data from one becomes the input data for the next. This data is represented as a serializable Java object called a BPBean message.

Thus an application that uses Business Process Beans (BPBeans) contains a hierarchy of processes and activities that exchange messages. If these are defined well, each process at every level of this hierarchy should describe a useful business service since this increases understandability and reuse within the application. In addition processes and activities can be reused in many applications.

According to the present invention two or more navigators are available for use when executing a process and a navigator can be specified for each process. As a result two processes can be executed by two different navigators and therefore the way in which a graph is interpreted and executed can be different for different processes. This is now illustrated with reference to FIG. 3.

Figure 3:
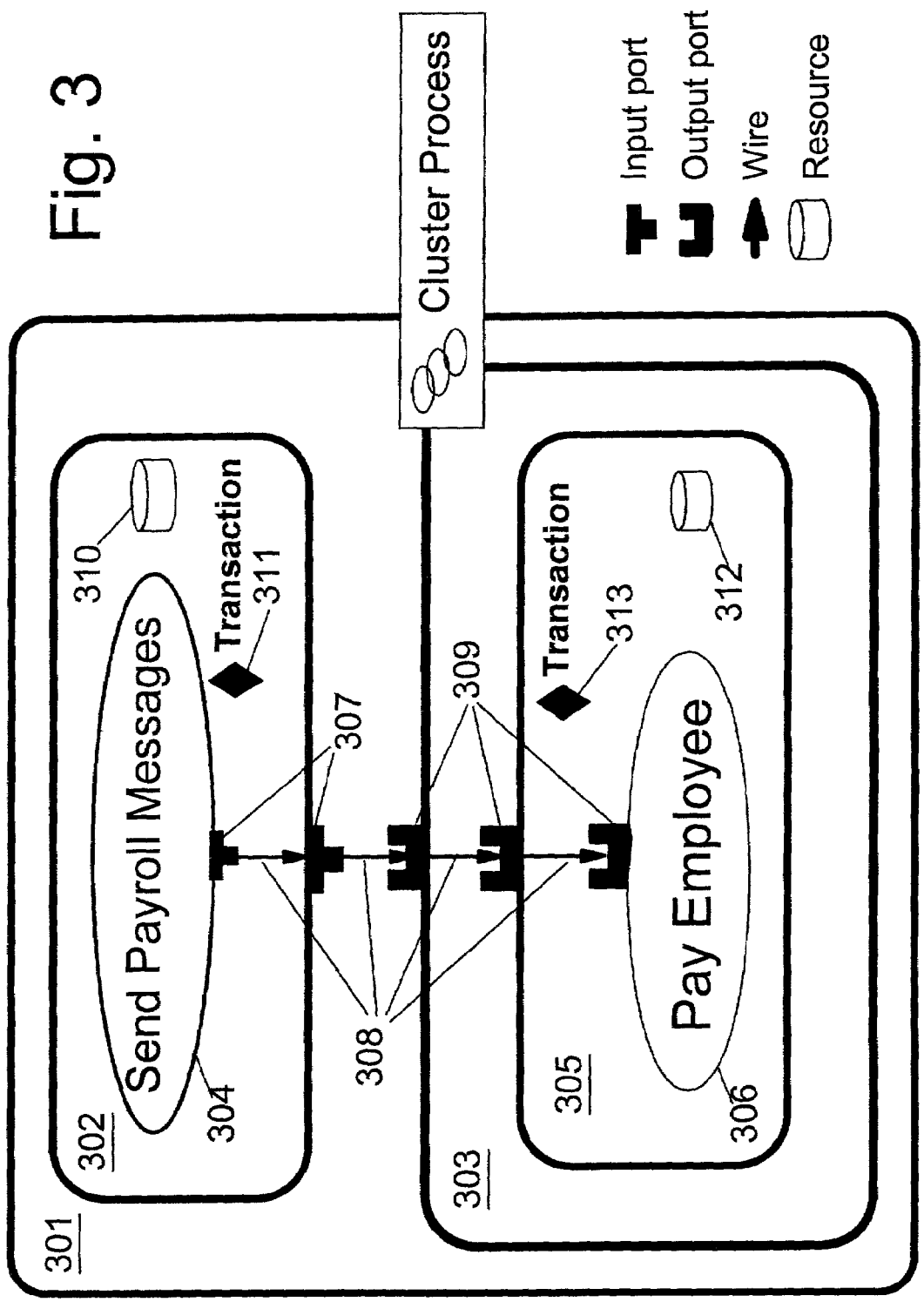
FIG. 3 is a block diagram of an example of a workflow graph according to the preferred embodiment of the present invention.

FIG. 3 shows a simple BPBeans workflow graph illustrating one example of a workflow graph executable by the method of the present invention. It shows a single payroll process (301) which is used to pay employee salaries. This process contains two child components both of which are processes (302, 303), child process 302 contains a Send Payroll Messages activity (304) which accesses database (310), and child process 303 contains another process (305) which contains a Pay Employee activity (306) which accesses a database (312). The Send Payroll activity (304) sends a message to the Pay Employee activity via a sequence of output ports (307), wires (308) and input ports (309). The message contains an employee id and salary to be paid. Note that the databases (310, 312) could be the same database.

In a prior art implementation in which this graph is executed by a single navigator, the navigator might: start the Send Payroll Messages activity (304) which subsequently generates an output message; end the Send Payroll Messages activity (304); start the Pay Employee Activity (306); deliver the message to the Pay Employee activity (306); and end the Pay Employee Activity (306) when it indicates that it has completed. This is clearly quite restrictive and would require either additional processes and activities, or a large message containing all employee id's and salaries, if it is to pay all employees in a company. There would also be additional wiring required to cope with failures, such as failure to send a message or failure to credit a particular employees bank account.

However, according to the present invention, one or more of the processes of FIG. 3 can be configured as a process type, each different process type having a different navigator associated with it, each navigator implementing a different strategy for executing the process. The application developer configures the process type of a process in the "builder-type" tool used to generate the graph. For example, as processes are components, a process of the required process type could be selected from a selection of components and dragged and dropped into the graph. Alternatively a process type could be configured from a selection list after a generic process has been dragged and dropped into the graph, thus also enabling the process type of a process to be easily changed. Thus the selection of the navigator to use may be inherent in the selection of the process or may require explicit selection by the application developer.

In this example, processes of FIG. 3 are configured with process types as follows:

Payroll Process (301) is configured as a concurrent process. This means that it will be executed using a concurrent process navigator which is used to start all children of a process at the same time. Generally children are left running until they generate an outcome (i.e.: indicate that they are complete) although others are directed to complete.

Processes 302 and 305 are configured as activity wrapper processes which means that they will be executed using an activity wrapper process navigator. This navigator is used to run a child activity in a predefined environment. In this case the both the Send Payroll Messages activity (304) and the Pay Employee activity (306) are configured to be executed under the scope of a transaction, as indicated by diamond symbols (311, 313). Both activity wrapper processes are configured, in the event of failure, to rollback and report a failure. As a result, in the event of failure, these activities can be re-run.

Process 303 is configured as a cluster process which means it will be executed using a message cluster process navigator. This navigator requires a single child process/activity and it starts a new instance of the child process/activity to process each message that it receives. In the event of a child process/activity instance reporting a failure a replacement instance is created to process the message. This process wait to be told to complete.

The processing of the graph is now much different. When the payroll process is started it is executed using the concurrent process navigator which starts processes 302 and 303. Process 302 is an activity wrapper process and is executed using the activity wrapper process navigator which starts a transaction and then the Send Payroll Messages activity (304). Process 303 is a message cluster process and is executed using the message cluster process navigator which waits to receive a message. Subsequently the Send Payroll Messages activity (304) sends a message containing an employee id and salary and continues processing. This message is then delivered to process 303 for which the message cluster process navigator starts an instance of process 305, delivers the message to it, and then waits for another message. Process 305 is an activity wrapper process and is executed using the activity process navigator which starts a transaction and invokes the Pay Employee activity (306). The Pay Employee Activity (306) obtains details of the employee bank account, transfers the required salary to it, prints a pay slip, and records, with the employees data, that the salary has been paid. It then completes, the transaction is committed and process 305 ends. Meanwhile the Send Payroll Messages activity has generated one or more messages, each of which are delivered to process 303 which starts a new instance of process 305 for each message and delivers a message to it as described. As a result it is possible for more than one instance of process 305 to be active at any one time. If a Pay Employee Activity (306) fails, its transaction is rolled back and the failure is reported to process 303. Process 303 then starts a new instance of process 305 to process the message originally given to the failed instance. If the Send Payroll Messages activity (304) fails it rolls back the transaction, reports a failure, and completes.

Note that FIG. 3 does not include graphical indications of process type with each process, however, in other embodiments this may be done.

Whilst not all of the details of the processes and activities of FIG. 3 have been described it can clearly be seen that the use of different navigators for different processes can greatly increase the functionality that can be specified with a workflow graph.

Figure 4:
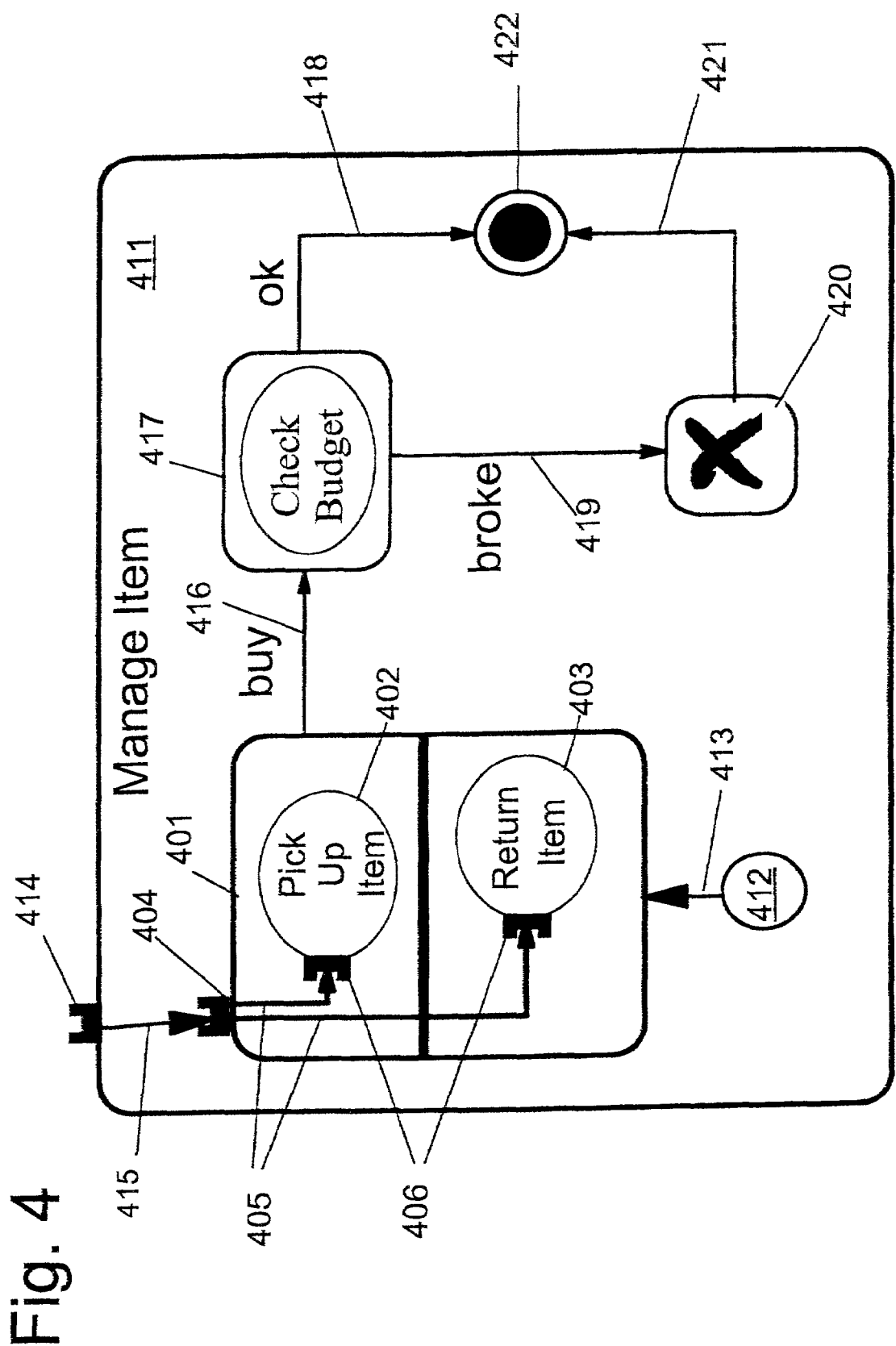
FIG. 4 is a block diagram of an example of a workflow graph according to the preferred embodiment of the present invention.

Two more process types are now described as illustrated in FIG. 4. These are configured as follows:

Process 401 is configured as a compensation pair process. This means that it will be executed by a compensation pair process navigator. A compensation pair process is used to support compensation groups. A compensation pair process which typically contains two tasks: a primary task is a component which is started by the navigator when the process is activated; and a compensation task is a component which is started by the navigator when instructed to compensate. This will happen if the primary task succeeds but another component in the compensation group fails, resulting in the need to compensate. Process 401 includes a Pick Up Item activity (402) at the top and a Return Item activity (403) at the bottom. The component at the top is the primary task and the component at the bottom is the compensating task. Note that for the compensation pair process (401) illustrated, any message received on input port 404 is duplicated and provided to both the primary task (402) and compensation task (403) via wires (405) and input ports (406). The means that if the compensation task (403) is run it will have available the input data that the primary task processed.

Process 411 is a configured as a sequential process. This means that it will be executed by a sequential process navigator. This navigator runs one child at a time, starting from a start point, ending at an end point, and following a predefined sequence in the workflow graph. Process 411 has a start point (412), an end point (422), and arrows (413, 416, 418, 419, 421) that define the invocation sequence. Note that a sequential process can define more than one end point.

The execution of the workflow graph illustrated in FIG. 4 is now described according to the present invention. The first component after the start point (412) is started first and this is the compensation pair process (401) which starts the Pick Up Item activity (402) which is its primary task. This receives a message sent to the sequential process 411 via an input port (414) and delivered to the Pick Up Item activity via input ports (404, 406) and wires (415, 405). The message contains an item and its price. The Pick Up Item adds this item and its price to a shopping basket database (not shown). If this fails the Manage Item process (411) fails and ends, however, if it works the next child component in the sequence is started which is the Check Budget activity (417).

The Check Budget activity (417) calculates the total cost of the shopping basket (which may include more than one item if this process has been previously started) and compares it with a predefined shopping budget. If the budget has not been exceeded the Check Budget activity (417) reports an outcome of "ok" and process proceeds to the end point (422) at which point the process ends. However, if the budget has been exceeded the Check Budget activity (417) reports an outcome of "broke" and processing continues to the unsuccessful completion step (410) which causes all outstanding compensating tasks in the compensation group to be run.

The scope of the compensation group is the children of Manage Item process (411) (the process which included the completion step) and so the Return Item activity (403), which is the compensating task of the only child compensation pair process (401), is run. This uses the message that contains the item and price to remove the item from the shopping basket thus undoing the previous work of Pick Up Item. Once the Return Item Activity has ended processing continues to the end point (422) and the process ends.

Note that the manage Item Process (411) does not include a successful completion step. As a result if process completes without running compensation task (403), it is possible that a parent process will subsequently require the compensation task to be run.

Thus FIGS. 3 and 4 have been used to illustrate five process types: concurrent; message cluster; activity wrapper; compensation pair; and sequential. However, many more process types are possible, and some examples are:

Instance Cluster process: where messages arriving at the cluster are classified according to the value of a particular field in the message. The cluster maintains an instance of the single child defined in its workflow graph for each message field value it sees and passes all of the messages that have that value to that instance.

Source Cluster process: where instances of the single child defined by its workflow graph are created for each message source supplying messages to the cluster.

Swap process: Uses the state of one child component to control which one of the other children should be running at any one time.

Repeat process: reruns the single child inside it a prescribed number of times (or until a condition occurs.)

Retry process: repeatedly reruns the single child inside it (including replaying all of its messages) until either it succeeds or a retry threshold is reached. (This is particularly useful if the child executes under an ACID transaction that rolls back due to a transient error.)

Time Limit: runs the single child inside it and stops it if it runs for longer than the specified time limit It is also a feature of the preferred embodiment of the present invention that the navigation engines are pluggable. For example, in BPBeans it is easy for an application developer to define a new process type and a navigation engine to execute it, and plug them into the "builder-type" tools such that the new process types can be used in the same way as the standard process types provided with BPBeans.

In order to describe the pluggable nature of navigation engines in BPBeans it is necessary to consider how BPBeans components are stored and managed in storage, such that they can be read by the "builder-type" tool and used by an application developer in creating a workflow graph.

BPBean activities and processes are both specified by a Meta Object Facility (MOF) model and implemented in a JavaBean. The model defines the characteristics of the component and the JavaBean provides its executable program. For example, the MOF model of an activity can specify what inputs the activity requires and what outputs it generates, and the JavaBean performs the task. Alternatively the MOF model of a process can specify, for example, how many children it may contain, and the JavaBean implements how the process controls its children such as when and how many are started, when they are ended, and what is done in the event of failure.

As a result the MOF model and JavaBean of a process effectively define its process type. For example, MOF model of a message cluster process defines a process that accepts one child component and the JavaBean creates an instance of the child component for each message received and, in the event of a child failure, creates a replacement child instance to process the message. Note that as the JavaBean executes the process type it is therefore its navigation engine.

Hence it can be seen that activities and processes are defined in the same way. As activities, which generally perform business function, are created by application programmers, it follows that application programmers can also create processes and therefore define process types and implement navigation engines.

Having defined activities and process types in MOF models and associated JavaBeans, the BPBeans "builder-type" tool, called the Application Builder for Components (ABC), is used to generate the workflow graphs. The ABC reads the MOF models that are available, for example from configured directory, into a repository and makes them available to the application programmer. As a result if the MOF model of a new process type is placed in the required directory the ABC tool will read it and make it available to the application programmer in the same way as any other component.

When the application programmer has defined a workflow graph which defines an outer process and a hierarchy of child components that it contains, the workflow graph is stored, prior to execution, as a MOF Object for the outer process and a hierarchy of MOF objects for the child components. The MOF Objects contain defined instances of a MOF model. For example the MOF model of a process type might define that the process must contain at least two children, whereas the MOF object defines an instance of the process that has been included in a workflow graph and now contains, for example, the four MOF objects that define its child components.

Figure 5B:
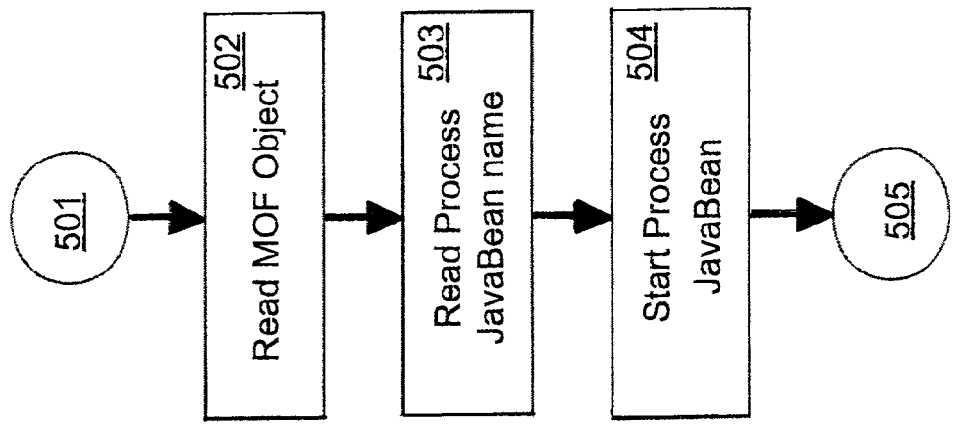
FIGS. 5a and 5b are flow diagrams of processing performed when executing a workflow graph according to a preferred embodiment of the present invention.
Figure 5A:
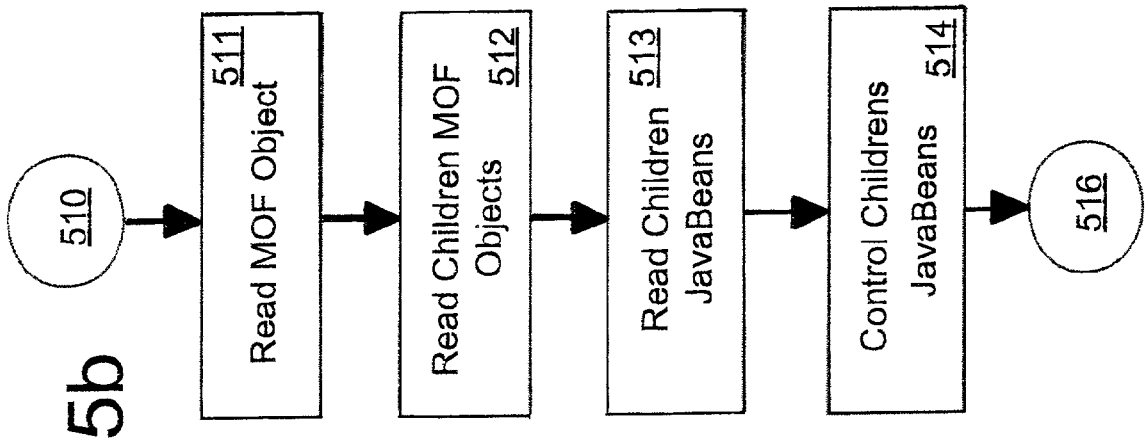

Once the hierarchy of MOF model objects for the application has been defined, the execution of an application is defined in FIGS. 5a and 5b. In FIG. 5a, at step 502 the BPBeans runtime reads the MOF object that represents the outer process (single process at the top of the hierarchy). The BPBeans runtime then extracts the name of the JavaBean associated with the outer process from its MOF object at step 503, and creates an instance of the JavaBean, supplying it with its own MOF object at step 504. Note that, as previously discussed, the JavaBean of a process is its navigation engine FIG. 5b shows the processing of a process Java Bean (navigation engine) such as that of the outer process. The navigator instance reads its own MOF model object at step 511, and then reads the MOF Objects for all its children at step 512. At step 513 the names of the JavaBeans that implement the children are read from the MOF Objects. The navigator then spawns its children by invoking their JavaBean, passing each child its own MOF object, as and when appropriate at step 514. As a result, if the child MOF object defines a process its JavaBean will be a navigator and will continue processing as in FIG. 5b, whereas an activity Java bean will simply complete its task. As a result each process spawns its children as and when appropriate. This is repeated at every level of the hierarchy resulting in a fully activated and running application. Additionally services, such as security and transactions, are called where specified by the MOF model.

Note that, in addition to defining the behavior of the application, the BPBeans MOF model can also be used to display: monitoring information, such as what is running, its state and performance statistics; and debug information such as RAS messages and trace.

It is therefore quite simple to create new process types and the navigation engines used to execute them. The requirements of the process types, such as how many children it accepts, are specified in a MOF model. The MOF model is read by the "builder-type" tool such that when an application developer decides to set a process to a particular process type the tool reads the MOF model (or some other file, such as an XMI file, that is derived from the MOF model) and ensures that the application developer builds the process in an acceptable form. Once the developer has defined an application it is saved in a hierarchy of MOF objects. The MOF object of a process type includes the name of a JavaBean, which is its navigation engine, and is used at run time to control the children of the process. Note that, in other embodiments, the requirement of the process types could be specified in any definition language that the builder tool can read, and the program entity that implements a navigation engine could be any type of program entity such as a C++ object, REXX program etc. Also a single navigation engine could be implemented that recognises different process types and processes them accordingly, effectively providing a plurality of navigation engines in a single program entity.

Thus, the present invention describes a workflow environment in which different navigators are used for different processes. Further the navigators are easily created and programmed and plugged into the builder-type tool for selection by the application developer. As a result many different navigators are possible and can be tailored to the function of the application, although in practice, to maintain the ease of use of the system, it is advantageous to limit the number of navigators.

Whilst the preferred embodiment of the present invention has been described in terms of BPBeans using MOF models, MOF objects and JavaBeans, the present invention could also be applied to other "builder-type" environments. At an abstract level BPBeans activities and processes are simply components and the process types are navigators. In addition the method in which these are defined in BPBeans should only be considered as examples.

The invention claimed is:

1. A data processing method for running a workflow application in a data processing system, the method comprising:
running a workflow application, comprising a plurality of components, each component performing a defined function, the component being arranged to form a graph, wherein a component which comprises at least one other component is a process and wherein the graph comprises a plurality of processes;
interpreting the graph wherein at least two of said plurality of processes are interpreted by one of a plurality of navigation engines according to different respective sets of rules allowing reuse of said plurality of said components;
wherein the graph is interpreted by a plurality of navigation engines each implementing a different set of rules and the method further comprises the step of:
selecting which navigation engine is to be used to interpret a given process;
reading the details of a navigation engine, to be used to execute a given process, from a data file associated with the given process;
calling the navigation engine to interpret the process; and
wherein one set of rules specifies that each component in a process is started successively, the next component not being started until the previous component has stopped, wherein the order in which components are started is defined in the graph of the process.

2. A data processing method as claimed in claim 1 wherein calling said given process causes the details of the data file to be passed to the navigation engine.

3. A data processing method as claimed in claim 1 one set of rules specifies that all components in a process are started successively without waiting for previously started processes to complete.

4. A data processing method as claimed in claim 1 wherein one set of rules specifies that a process must contain only one component, a new instance of the component being started each time the process receives a new message.

5. A data processing method as claimed in claim 1 wherein one set of rules specifies that a process that must contain only one component which contains no other components, and a transaction is started before starting the component and committed after stopping the component.

6. A computer program product, recorded on a medium, comprising instructions which when executed on a data processing system to carry out the method of:
running a workflow application, comprising a plurality of components, each component performing a defined function, the component being arranged to form a graph, wherein a component which comprises at least one other component is a process and wherein the graph comprises a plurality of processes;
interpreting the graph wherein at least two of said plurality of processes are interpreted by one of a plurality of navigation engines according to different respective sets of rules allowing reuse of said plurality of said components;

wherein the graph is interpreted by a plurality of navigation engines each implementing a different set of rules and the method further comprises the step of:

selecting which navigation engine is to be used to interpret a given process;

reading the details of a navigation engine, to be used to execute a given process, from a data file associated with the given process;

calling the navigation engine to interpret the process; and wherein one set of rules specifies that each component in a process is started successively, the next component not being started until the previous component has stopped, wherein the order in which components are started is defined in the graph of the process.

7. A computer program product as claimed in claim 6 wherein calling said given process causes the details of the data file to be passed to the navigation engine.

8. A computer program product as claimed in claim 6 wherein one set of rules specifies that each components in a process are started successively without waiting for the previously process to complete.

9. A computer program product as claimed in claim 6 wherein one set of rules specifies that a process must contain only one component, a new instance of the component being started each time the process receives a new message.

10. A computer program product as claimed in claim 6 wherein one set of rules specifies that a process that must contain only one component which contains no other components, and a transaction is started before starting the component and committed after stopping the component.

11. A data processing method for running a workflow application the application comprising:

a plurality of components, each component performing a defined function, the component being arranged to form a graph, wherein a component which comprises at least one other component is a process and wherein the graph comprises a plurality of processes; the system comprising:

means to interpret the graph wherein at least two of said plurality of processes are interpreted by one of a plurality of navigation engines according to different respective sets of rules allowing reuse of said plurality of said components;

wherein the means to interpret the graph comprises a plurality of navigation engines each implementing a different set of rules and the system further comprises:

means for selecting which navigation engine is to be used to interpret a given process;

means for reading the details of a navigation engine to be used to execute a given process, from a data file associated with the given process;

means for calling the navigation engine to interpret the process; and wherein one set of rules specifies that each component in a process is started successively, the next component not being started until the previous component has stopped, wherein the order in which components are started is defined in the graph of the process.

12. A data processing system as claimed in claim 11 wherein the means for reading further passes details of the data file to the navigation engine in response to said given process being called.

13. A data processing system as claimed in claim 11 wherein one set of rules specifies that all components in a process are started successively without waiting for previously started processes to complete.

14. A data processing system as claimed in claim 11 wherein one set of rules specifies that a process must contain only one component, a new instance of the component being started each time the process receives a new message.

15. A data processing system as claimed in claim 11 wherein one set of rules specifies that a process that must contain only one component which contains no other components, and a transaction is started before starting the component and committed after stopping the component.

* * * * *